United States Patent [19]
Gatlin

[11] Patent Number: 4,867,285
[45] Date of Patent: Sep. 19, 1989

[54] BRAKE SHOE MOUNTING ASSEMBLY
[75] Inventor: Sidney Gatlin, Tampa, Fla.
[73] Assignee: E. S. Gatlin Enterprises, Inc., Tampa, Fla.
[21] Appl. No.: 262,219
[22] Filed: Oct. 21, 1988

Related U.S. Application Data

[63] Continuation of Ser. No. 178,862, Apr. 6, 1988, abandoned, which is a continuation of Ser. No. 13,117, Feb. 10, 1987, abandoned.

[51] Int. Cl.$^4$ ........................ F16D 69/00; F16D 65/08
[52] U.S. Cl. .................. 188/250 D; 188/245; 188/234; 188/238; 188/250 R
[58] Field of Search ............... 188/245, 250 G, 250 C, 188/234, 250 A, 250 D, 250 B, 238, 242, 252, 236, 241, 243, 246, 250 R, 250 F; 192/74, 77, 115, 107 T

[56] References Cited

U.S. PATENT DOCUMENTS

| | | | |
|---|---|---|---|
| 1,561,701 | 11/1925 | Down | 188/234 |
| 1,743,412 | 1/1930 | Waite | 188/250 C |
| 1,749,901 | 3/1930 | Brownyer | 188/234 |
| 2,004,842 | 3/1934 | Wandell | 188/234 |
| 2,040,551 | 5/1936 | Green | 188/234 |
| 2,291,525 | 11/1940 | Bessey | 188/242 |

FOREIGN PATENT DOCUMENTS

| | | | |
|---|---|---|---|
| 675100 | 12/1963 | Canada | 188/250 A |
| 2003074 | 11/1969 | France | 188/250 G |
| 328767 | 4/1935 | Italy | 188/245 |
| 412299 | 6/0134 | United Kingdom | 188/234 |
| 186422 | 9/1922 | United Kingdom | 188/250 C |

Primary Examiner—Andres Kashnikow
Assistant Examiner—Mark T. Le

[57] ABSTRACT

A brake shoe mounting assembly is provided for a brake mechanism mounted within an axle housing located on the inboard side of a wheel mechanism and having an arcuate brake drum assembly mounted therein. The mounting assembly includes an arcuate brake shoe disposed in the housing for confronting the brake drum assembly and an actuator apparatus mounted in the housing and being engageable with the brake shoe and responsive to engagement of the brake pedal for expanding the brake shoe into frictional engagement with the brake drum. The actuator and the brake shoe are interconnected for sliding and in particular, a slotted beam assembly is attached to either one of the actuator and the brake shoe and an insertion assembly is attached to the other. The slotted assembly extends in an inboard direction and slidably receives the insertion assembly. The insertion assembly is releasably fastened within the slotted assembly to lock together the actuator and brake shoe and the slotted and insertion assemblies are released to enable selective removal of the brake shoe from and insertion of the brake shoe into the housing through the inboard end.

10 Claims, 2 Drawing Sheets

BRAKE SHOE MOUNTING ASSEMBLY

This application is a continuation of application Ser. No. 07/178,862, filed Apr. 6, 1988, now abandoned, which was in turn a continuation of application Ser. No. 07/013,117, filed Feb. 10, 1987, now abandoned.

BACKGROUND OF THE INVENTION

This invention relates to an improved brake shoe mounting assembly and in particular to a brake shoe mounting assembly for heavy equipment such as trucks, tractors and trailers.

Repairing and replacing conventional brake shoes is typically a tedious and time consuming operation. In most cases the wheel mechanism must be removed before the work is performed. The difficulty of this task is compounded when the vehicle requiring brake servicing is a truck, trailer, tractor or other heavy vehicle. The wheel assembly, including the tire and hub, on such a vehicle is typically too heavy for one or two persons to manipulate and, as a result, hoists, jacks or other appropriate lifting apparatus are required. This adds considerably to the cost and complexity of performing brake repairs and, if a wheel lifting tool is unavailable when the vehicle's brakes fail then it is virtually impossible to perform the required repairs.

At least one mechanism of the prior art does permit the brake shoe to be replaced without removing the wheel, (As disclosed in U.S. Pat. No. 3,820,638 to Ebey). However, that device is relatively complicated to assemble and requires removal of the brake shoe web mechanism before the shoe itself can be replaced.

SUMMARY OF THE INVENTION

It is therefore an object of this invention to provide an improved brake shoe mounting assembly that permits brake shoes to be removed and installed quickly, easily and inexpensively without requiring removal of the wheel assembly.

It is a further object of this invention to provide such a brake shoe mounting assembly that enables the brake shoe to be replaced without removing the stabilizer, brake web or other elements associated with the brake.

It is a further object of this invention to provide a brake shoe mounting assembly that is particularly effective for use in trucks, tractors, trailers and other heavy vehicles.

This invention results from a realization that an improved brake shoe mounting assembly that permits brake shoes to be removed and replaced without requiring removal of the wheel mechanism or disruption of surrounding brake parts may be achieved by slidably interconnecting the brake shoe assembly and the brake web mechanism so that the brake shoe assembly may slide conveniently out of the brake housing through the inboard end. By releasably fastening together the brake shoe assembly and web mechanism, the brake shoe remains firmly in place in the housing during use.

This is accomplished by a brake shoe mounting assembly for a brake mechanism mounted within an axle housing located on the inboard side of a wheel mechanism and having an arcuate brake drum assembly mounted therein. The assembly features arcuate brake shoe means disposed in the housing for confronting the brake drum assembly. There are web means mounted in the housing and engageable with the brake shoe means and responsive to engagement of the brake pedal for expanding the brake shoe means into frictional engagement with the brake drum assembly. Means are provided for slidably interconnecting the web means and the brake shoe means including slotted means attached to either one of the web means and the brake shoe means and insertion means attached to the other one of the web means and the brake shoe means and being slidably receivable by the slotted means. There are means for releasably fastening the insertion means within the slotted means to lock together the web means and the brake shoe means. The means for releasably fastening are releasable to enable selective removal of the brake shoe means from, and insertion of the brake shoe means into the housing through the inboard end.

In a preferred embodiment the web means includes a plurality of spaced apart generally arcuate elements interconnected by the slotted means. The web means may include a pair of such arcuate elements. The slotted means may include at least one transverse beam interconnecting the arcuate elements, the beam including a longitudinal slot disposed therein. Gusset means may interconnect the arcuate elements and the slotted means.

The brake shoe means may include a brake pad support section and brake pad means attached to the brake pad support section. The support section may include a plurality of support flanges and the brake pad means may include at least one pad element associated with each support flange.

The insertion means may include at least one elongate channeled member fitting longitudinally in a respective slot and including an axial channel. Where the support section includes the plurality of axially adjoining support flanges the channel member may include a plurality of alignable channel portions, each of which is carried by a respective support flange.

The means for releasably fastening may include at least one bolt, the bolt being receivable by a respective channel and having at one end a head portion for engaging the outboard end of a respective slotted beam and at the opposite end threads that are engageable with nut means for engaging the inboard end of the channel member to fasten the channel member within the slot. The nut means may include a shoulder nut and a clamp disposable between the shoulder nut and the channel member and having an aperture for receiving the bolt.

BRIEF DESCRIPTION OF THE DRAWINGS

For a fuller understanding of the nature and objects of the invention, reference should be had to the following detailed descriptions taken in connection with the accompanying drawings, in which.

Similar reference characters refer to similar parts throughout the several views of the drawings.

DETAILED DESCRIPTION OF PREFERRED EMBODIMENT

Figure 1:
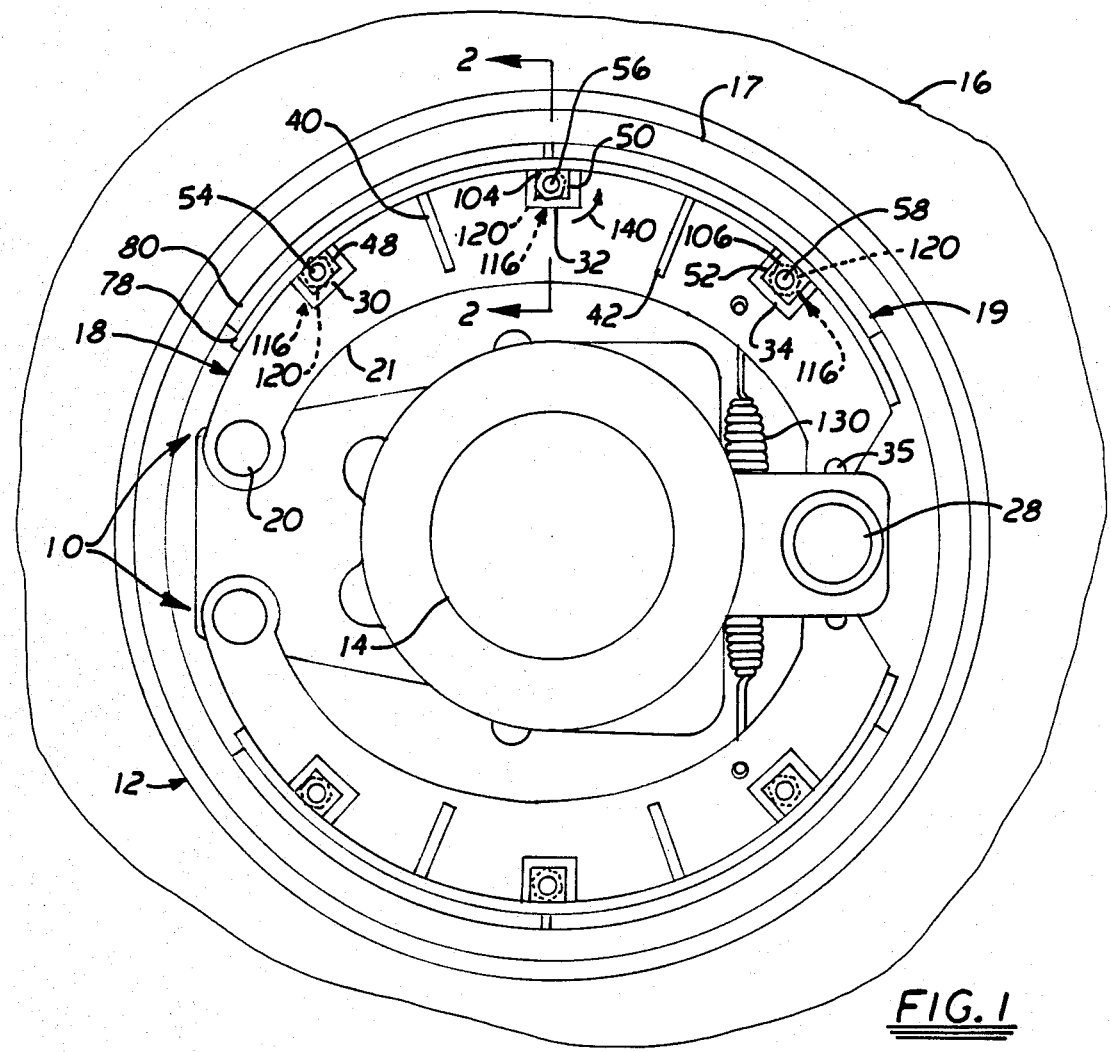
FIG. 1 is an elevational view of the brake shoe mounting assembly of this invention disposed within an axle mounted brake housing.

There is shown in FIG. 1 a brake shoe mounting assembly 10 according to this invention which is disposed in a brake housing 12 mounted on a wheel axle 14. The axle is attached at its end in a conventional manner to a wheel mechanism 16, only a portion of which is shown. Axle housing 12 is disposed on the inboard side of wheel mechanism 16 and, typically, during operation of the vehicle is covered by a dust covering which is removed in FIG. 1 for clarity.

Figure 2:
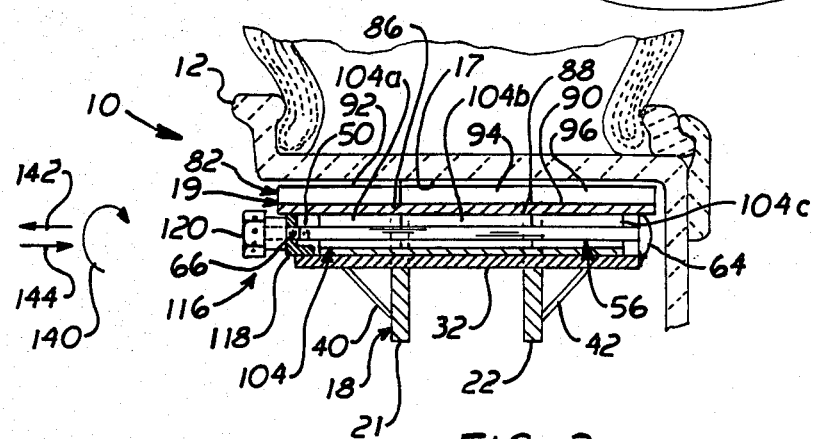
FIG. 2 is a sectional view taken along line 2—2 of the mounting assembly of FIG. 1 with the brake shoe disengaged from the brake drum.

A brake drum 17 is mounted in a conventional manner generally circumferentially within housing 12. The brake mechanism typically includes a pair of mounting assemblies 10 one of which is illustrated in FIG. 2. The description which follows applies equally to both of the mounting assemblies 10.

In particular, the mounting assembly includes an arcuate stabilizer or web apparatus 18 which is pivotably mounted in a conventional manner within the brake housing 12, for example by pivot 20 shown in FIG. 1. Assembly 10 also includes a brake shoe section 19 which is operatively interconnected with and engageable by web 18 as described more fully below.

Figure 4:
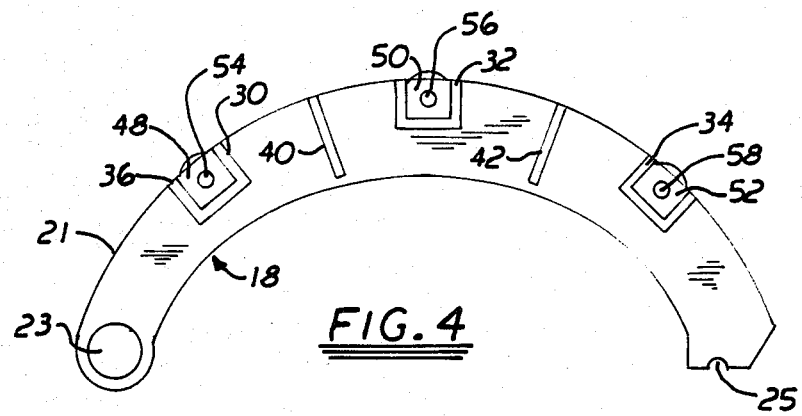
FIG. 4 is an elevational front view of the web mechanism of FIG. 3 with the fastening bolts illustrated within the beams slots.
Figure 3:
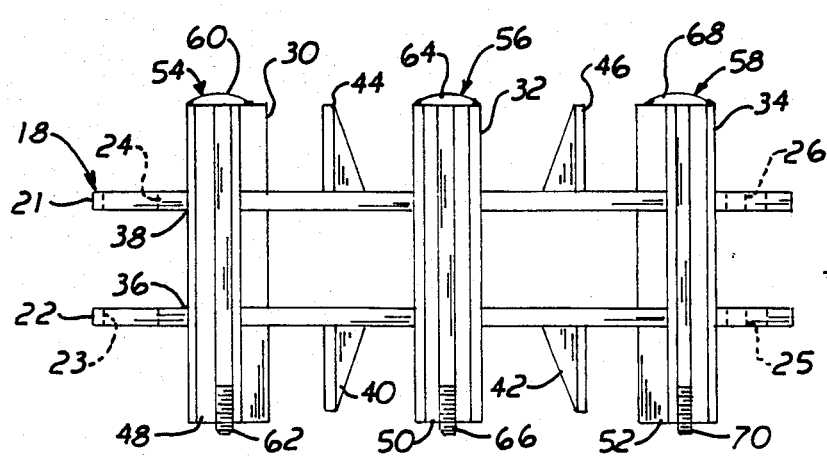
FIG. 3 is a top plan view of the web mechanism and slotted beams with the fastening bolts inserted therein.

As shown in FIGS. 2, 3 and 4 web 18 includes a pair of arcuate elements 21 and 22 which are spaced apart axially within housing 12. Elements 21 and 22 are typically composed of steel, iron or other sturdy metallic material and include at one end respective aligned holes 23 and 24, shown in FIGS. 3 and 4, for receiving pivot 20. The other end of each arcuate element 21 and 22 includes a respective recess 25 and 26 for engaging, in a conventional manner, the pneumatically or hydraulically driven camming mechanism 28 shown in FIG. 1. Elements 21 and 22 are interconnected by transverse beams 30, 32 and 34, which beams are likewise constructed of steel or a similar metal. Each beam, for example beam 30, as shown in FIGS. 3 and 4, is disposed in a pair of aligned recesses, 36 and 38 in respective members 21 and 22 and is welded or otherwise attached therein in a relatively permanent manner. As shown in FIGS. 1–4, a pair of metallic gusset elements 40 and 42 are attached by welding or other suitable means to arcuate element 21 between beams 30 and 32 and beams 32 and 34, respectively. A similar pair of triangle gusset elements 44 and 46 are attached to arcuate element 22 between beams 30 and 32 and 32 and 34, respectively. These gussets provide reinforcing support for web 18 and brake shoe section 19 as described more fully below.

Beams 30, 32 and 34 have respective axial slots 48, 50 and 52 extending therethrough in a generally inboard/outboard direction. Each slot receives a respective fastening bolt 54, 56 and 58. As shown most clearly in FIG. 3, bolt 54 includes a head 60 at one end that engages the outboard end of beam 30 and opposite threaded end 62 which extends just beyond the inboard end of beam 30. Bolt 56 similarly includes a head 64 that engages the outboard end of beam 32 and a threaded end 66 extending through the inboard end of beam 32; and bolt 58 has a head 68 and an opposite threaded end 70.

Figure 5:
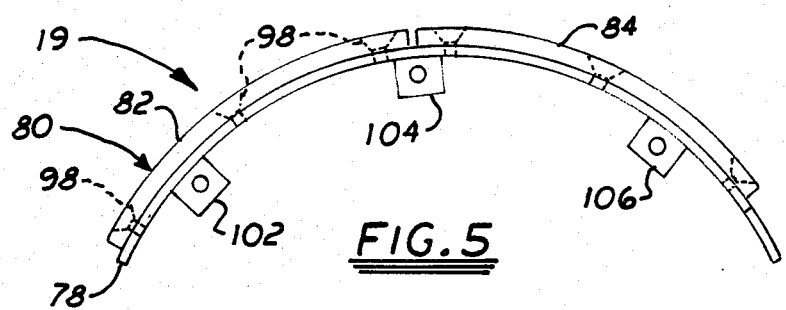
FIG. 5 is an elevational view of the brake shoe means.
Figure 6:
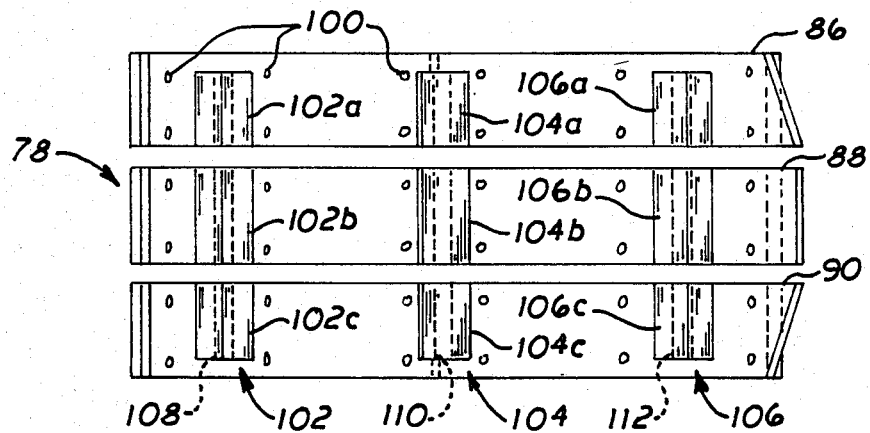
FIG. 6 is a bottom view of the brake shoe means.

The brake shoe section 19 supported by web mechanism 18 is shown alone in FIG. 5. Section 19 includes an arcuate support section 78 and a brake pad section 80 that includes arcuate half portions 82 and 84. Support section 78 comprises three adjoining arcuate elements or flanges 86, 88 and 90 shown in FIG. 6. As shown in FIG. 2, each of brake pad half portions 82 and 84 includes three axially arranged pad elements 92, 94 and 96, mounted respectively on flanges 86, 88 and 90. As a result, each of the support flanges 86, 88 and 90 accommodates a pair of pad elements, e.g. one from each of halves 82 and 84. In particular flange element 86 supports pads 96; flange element 88 supports pads 94; and flange 90 supports pad elements 92. Each of the pad elements is attached to its respective flange by bolts 98, shown in FIG. 5, which extend through the pad elements and are received by complementary holes, shown in FIG. 6, in the flanges, though rivets could also be used.

Each flange includes three generally tubular channeled segments attached to its bottom surface. Specifically, flange 86 carries channeled segments 102$a$, 104$a$ and 106$a$; flange section 88 carries channeled segments 102$b$, 104$b$ and 106$b$; and flange element 90 carries channeled segments 102$c$, 104$c$ and 106$c$. The channeled segments are attached to the bottom of the flange elements by welding or other suitable means. When the flange elements are mounted together on actuator 18, as described below, the channeled segments are brought into alignment so that three elongate channel members 102, 104 and 106 are formed. As a result the bores or channels of the aligned channel segments are themselves aligned to form elongate channels 108, 110 and 112 in members 102, 104 and 106, respectively.

Support section 78 is mounted on web 18 by axially inserting channeled members 102, 104 and 106 into slotted beams 30, 32 and 34, respectively, of actuator mechanism 18. For example, as shown in FIG. 2, channeled segments 104$a$, 104$b$ and 104$c$ which form channeled member 104 are slid into slot 50 in the direction of arrow 144. Channeled members 104 and 106 are likewise inserted axially into slots 48 and 52, respectively. At the same time, bolts 54, 56 and 58 are inserted through respective channels 108, 110 and 112 in channel members 102, 104 and 106. That is, channel 108 receives bolt 54, channel 110 receives bolt 56 and channel 112 receives bolt 58. As a result flanges 86, 88 and 90 are seated on the upper surfaces of arcuate elements 21 and 22 and gusset elements 40, 42, 44 and 46. Each channeled member 102, 104 and 106 is then locked within its respective slotted beam 30, 32, 34 by a fastening mechanism 116. FIG. 2 illustrates one such fastening mechanism including an L-shaped clamp 118 and a shoulder nut element 120. Clamp 118 includes an aperture which receives the threaded end 66 of bolt 56. The clamp fits within slot 50 of beam 32 so that the foot of the clamp engages channeled member 104. Shoulder nut 120 threadably attaches to the end of bolt 56 and bears against clamp 118 to lock channeled member 104 in place within slot 50. Identical attachment mechanisms 16 are likewise employed with bolts 54, beam 30 and channeled member 108 and with bolt 58, beam 34 and channel member 106 respectively. With all of the channel members locked in their respective slotted beams in the above described manner, the brake shoe support section 78 and hence the entire brake shoe section 19, are locked transversely in place and prevented from sliding relative to web apparatus 18.

In operation, brake shoe mounting mechanism 10 is attached and locked as shown in FIGS. 1 and 2. With the brake pedal disengaged, spring 130 biases web 18 in the direction of arrow 132 so that brake pad portion 80 is spaced from brake drum 17. However, when the brake pedal is engaged, hydraulic or pneumatic components of the brake system operate cam mechanism 28 in a conventional manner to pivot web apparatus 18 about pivot 20. This urges brake shoe pad 80 into frictional engagement, as shown, with the brake drum 17. When servicing is required for brake shoe section 19, it is removed simply by unscrewing shoulder nut 120 in the direction of arrow 140, shown in FIG. 2. Nut 120 and clamp 118 are then removed from bolt 56 in the direction of arrow 142. Following removal of all three fastening mechanisms 116 in this manner, support flanges 86, 88 and 90 are removed from between web apparatus 18 and brake drum 17 by gripping the flanges and sliding them, typically one at a time in an inboard direction out of axle housing 12. In the process the channeled segments attached to flanges 86, 88 and 90 slide out of their respective slotted beams in the direction of arrow 142. This removal may be performed either by hand or with the assistance of a flat tool that is inserted between the flanges and web mechanism 18. Once the desired repairs have been performed on brake shoe section 19, it is reinstalled into housing 12 by sliding channeled members 102, 104 and 106 in the direction of arrow 144 into the slotted beams 30, 32 and 34 respectively and reattaching clamp 118 and shoulder nut 120 to each bolt. Accordingly, needed repairs and/or replacement of brake shoe section 19 may be performed quickly and effectively without having to remove wheel mechanism 16 or web apparatus 18, thereby reducing considerably the expense and inconvenience of repairing the brake mechanism.

While this detailed description has set forth one particularly preferred embodiment of the apparatus of this invention, numerous modifications or variations of the structure of this invention, all within the scope of the invention, will readily occur to those skilled in the art. Accordingly, it is to be understood that this description is illustrative only of the principals of the invention and is not limitative thereof, the scope of the invention being limited solely by the claims appended hereto.

Now that the invention has been described,

What is claimed is:

1. A brake shoe mounting assembly for a brake mechanism mounted within an axle housing located on the inboard side of a wheel mechanism and having an arcuate brake drum assembly mounted therein, said assembly comprising:
    arcuate brake shoe means disposed in said housing and including a plurality of axially adjoining brake pad support flanges and brake pad means attached to said support flanges to confront said brake drum assembly;
    web means including a plurality of axially spaced apart generally arcuate elements mounted in said housing and at least one transverse beam that interconnects said arcuate elements and includes a longitudinal slot therein, said web means being engageable with said brake pad support section and responsive to engagement of a brake pedal for expanding said brake shoe means and driving said brake pad means into frictional engagement with said brake drum assembly;
    at least one channeled member having a centrally disposed axial channel and formed by a plurality of alignable channelled segments attached respectively to each of said brake pad support flanges and being slidably receivable in a respective said slot; and
    means passing through said centrally disposed axial channel for releasably fastening each said channeled member in said slot to lock together said web means and said brake shoe means, said means for releasably fastening being releasable to enable selective removal of said brake shoe means from and insertion of said brake shoe into said housing through the inboard end.

2. A brake shoe mounting assembly for a brake mechanism mounted within an axle housing located on the inboard side of a wheel mechanism and having an arcuate brake drum assembly mounted therein, said assembly comprising;
    arcuate brake shoe means disposed in said housing for confronting said brake drum assembly;
    web means mounted in said housing and being engageable with said brake shoe means and responsive to engagement of a brake pedal for expanding said brake shoe means into frictional engagement with said brake drum assembly;
    means for slidably interconnecting said web means and said brake shoe means including means that include at least one transverse slotted beam attached to said web means and having a longitudinal slot disposed therein, and insertion means including at least one elongated channeled member attached to the said brake shoe means, said channeled member being slidably receivable by a respective said slot, in a direction generally parallel to the axle, and having an axial channel centrally disposed in said channeled member and
    means passing through said axial channel for releasably fastening said channeled member within said slotted beam including a bolt that is receivable by said channeled and has, at one end, a head portion for engaging the outboard end of said beam and, at the opposite end, thread means engageable with complementary nut means for engaging the inboard end of said channeled member within said slot.

3. The assembly at claim 2 in which said web means includes a plurality of axially spaced apart, generally arcuate elements interconnected by said slotted beam.

4. The assembly of claim 3 in which said web means includes a pair of said arcuate elements.

5. The assembly of claim 3 further including gusset means attached transversely to said arcuate elements.

6. The assembly of claim 2 in which said brake shoe means includes a brake pad support section and brake pad means attached to said brake pad support section.

7. The assembly of claim 6 in which said support section includes a plurality of axially adjoining support flanges.

8. The assembly of claim 7 in which said brake pad means includes at least one pad element associated with each said support flange.

9. The assembly of claim 2 in which said support section includes a plurality of axially adjoining support flanges and in which each said channeled member includes a plurality of alignable channel segments, each carried by a respective support flange.

10. The assembly of claim 9 in which said nut means includes a shoulder nut and a clamp disposable between said shoulder nut and said channeled member and having an aperture for receiving said bolt.

* * * * *